Oct. 14, 1969  M. F. CHEW  3,472,067
AUTOMOBILE ENGINE EXHAUST TESTING METHOD AND APPARATUS
Filed July 3, 1967
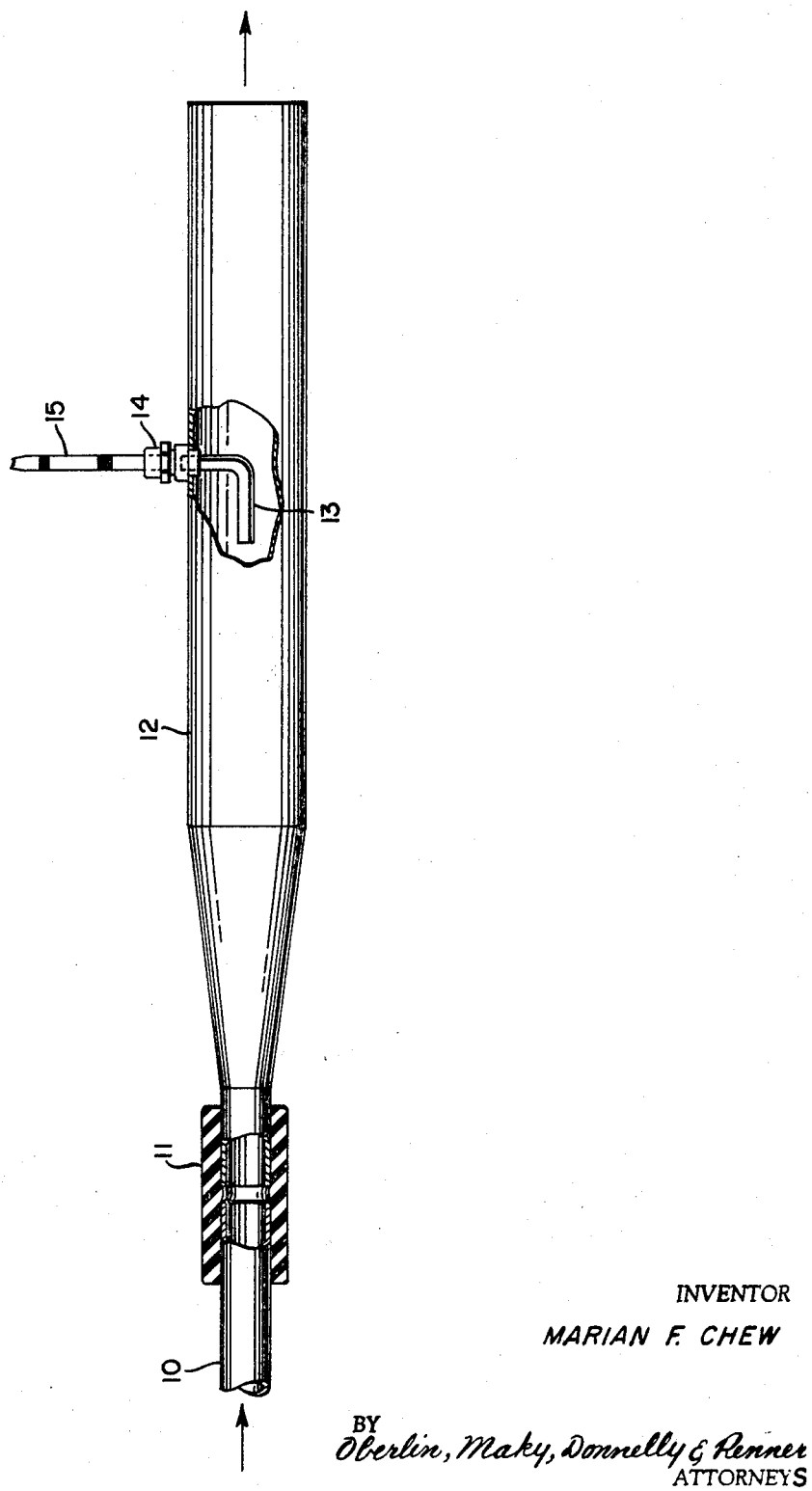
INVENTOR
MARIAN F. CHEW
BY Oberlin, Maky, Donnelly & Renner
ATTORNEYS

United States Patent Office 3,472,067
Patented Oct. 14, 1969

3,472,067
AUTOMOBILE ENGINE EXHAUST TESTING METHOD AND APPARATUS
Marian F. Chew, Mather Lane,
Chagrin Falls, Ohio 44022
Filed July 3, 1967, Ser. No. 650,921
Int. Cl. G01m 15/00
U.S. Cl. 73—116                                  5 Claims

ABSTRACT OF THE DISCLOSURE

The method of detecting automobile gasoline engines having high hydrocarbon and carbon monoxide emission under load by measuring the amount of carbon monoxide in the exhaust gases at engine idle condition. An adaptor to be fitted on the end of the automobile exhaust pipe and conducting the exhaust to an expansion chamber at which a carbon monoxide detector is located, the chamber being in the form of an open ended sleeve and the location of the detector spaced a predetermined distance inwardly from the open end.

DISCLOSURE

This invention relates to the testing or sampling of the exhaust of a gasoline powered automobile to determine whether the engine will have a high level of hydrocarbon and carbon monoxide emission throughout its operating cycles.

The invention is more particularly concerned with such testing as the means to evaluate the air pollution potential of the engine while the automobile is at any time on the road.

The area of automobile engine tuning or maintenance has been recognized as extremely significant in the efforts to control and minimize air pollution by automobile exhausts, since each engine is potentially unique in respect of its adjustment or maladjustment at any given time, without regard to design, model, age and the other usual factors of comparison, and there has been expressed a need for some form of road inspection procedure which could quickly be carried out to detect and identify high emitters for corrective attention. The provision of such a procedure performable by non-technical personnel is a primary object of the present improvements.

From the standpoint of air pollution, the exhaust gases of such gasoline engines are generally regarded as comprising hydrocarbons and oxides of nitrogen, which in sunlight produce an irritating photochemical smog, and carbon monoxide. As is well-known, oxides of nitrogen are extremely difficult to measure accurately, and measurement of hydrocarbons is also somewhat complicated in view of the wide range of the same and, as far as is known, direct exhaust analysis has been confined to the laboratory. One field approach has investigated air-fuel ratios, with high values known to produce nitrogen oxides and low or rich ratios resulting in excessive hydrocarbons and carbon monoxide. An instrument for such air-fuel ratio measurement has been proposed, but it is expensive and requires the attention of a technically trained person for consistently reliable operation; moreover this type of test will reveal only very high hydrocarbon emission and no information on carbon monoxide, which is of course fuel not burned to completion.

It has been discovered unexpectedly that there is a relation of the hydrocarbons and carbon monoxide which holds for all engine events or conditions of operation, whereby a measurement of the carbon monoxide in the exhaust when the engine is idling is a reliable indicator not only of the carbon monoxide emission under running or load conditions but also of the hydrocarbons. More particularly, it has been found that an engine which emits excess carbon monoxide at idle also emits excess hydrocarbons and, startlingly, that this will hold true for all operating cycles of the engine.

The invention thus provides measurement of the carbon monoxide contained in the automobile engine exhaust at idle condition as a means for detecting whether or not the engine should be classified as a high pollutant emitter. Carbon monoxide has of course a simple molecule compared to a hydrocarbon and can readily and inexpensively be measured, so that the invention is ideally suited for the desired automobile maintenance surveillance.

Another object of the invention is to provide apparatus to be utilized by non-technical personnel, for example in a safety lane check of traffic, to carry out such test procedure in convenient and rapid manner.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing, the single figure is a schematic illustration of apparatus in accordance with the present invention.

With further reference to the drawing, reference numeral 10 designates the exhaust pipe of an automobile to be tested by the new procedure. An adaptor sleeve 11, which is preferably flexible and can be made, for example, of silicone rubber, is fitted over the end of the pipe and provides a connection between the same and an expansion housing 12.

A sampling probe 13 is supported within the housing by a fitting 14 in the wall thereof, with this location being appreciably spaced inward from the outer open end of the housing.

The probe 13 is in the form of a small tube elbow directed inwardly to receive a portion of the exhaust gases discharged from the pipe and adiabatically expanding in the housing 12, which is of relatively much larger diameter. The fitting 14 is moreover designed to receive a carbon monoxide detector ampoule or cartridge 15. This cartridge is of commercially available type, supplied for example by Mine Safety Applicance Company and, as further shown in U.S. Patent 2,487,077, comprises a glass tube containing a dessicant to remove water vapor from the exhaust gases and a colorimetric carbon monoxide detection agent. This agent is a complex of an activated silica gel treated with a mixture of a palladium sulphate and ammonium molybdate solutions and reacts with the carbon monoxide to produce a clearly visible color change. The expansion of the exhaust gases in the housing 12 where the sample is extracted provides an appreciable lessening of the density for effective measurement with such a cartridge, and the inward spacing of the probe location should be adequate to protect against atmosphere dilution of the exhaust gases at this point.

It is preferred that the automobiles be classified in three groups as low, medium and high emitters, respectively, with corresponding ranges of carbon monoxide at idle condition or cut points established for the same. The range which have been found suitable are zero to 6.4%, 6.5% to 7.9% and over 8.0%, with the hydrocarbon content of the gases likewise increasing over these ranges regardless of the conditions under which the car is operated. The data set forth in the following tables demonstrates this relationship between carbon monoxide measurement at idle and hydrocarbon content under the various events or operating cycles.

Table I is an analysis of data derived from the Exhaust Gas Field Survey conducted by the Coordinating Research Council on about 200 automobiles operating in the area of Los Angeles, Calif., and shows the averages for twelve driving cycles as well as a weighted average value calculated from the average of each cycle. These automobiles, privately owned, were tested with laboratory equipment for emission of carbon dioxide, carbon monoxide, hydrocarbons, and oxides of nitrogen. Table II is an analysis of data based on another survey of slightly over 1000 vehicles in the same area and shows the averages for eight driving cycles as well as the weighted values established by the California Motor Vehicle Pollution Control Board. In each table, A means acceleration, C means cruise, and D means deceleration.

TABLE I

| Cycle | 0–6.4% CO at idle | 6.5–7.9% CO at idle | 8.0–12.5% CO at idle | Average |
|---|---|---|---|---|
| 0–60A: | | | | |
| Percent CO | 4.59 | 4.98 | 5.05 | .83 |
| Percent HC | 0.66 | 0.66 | 0.79 | 0.70 |
| 0–25A: | | | | |
| Percent CO | 3.07 | 3.72 | 4.18 | 3.60 |
| Percent HC | 0.76 | 0.88 | 1.07 | 0.90 |
| 15–30A: | | | | |
| Percent CO | 2.66 | 3.13 | 3.57 | 3.09 |
| Percent HC | 0.72 | 0.71 | 0.86 | 0.73 |
| 20C: | | | | |
| Percent CO | 2.95 | 3.80 | 5.64 | 4.08 |
| Percent HC | 0.88 | 1.02 | 1.23 | 1.03 |
| 30C: | | | | |
| Percent CO | 2.80 | 3.16 | 4.12 | 3.35 |
| Percent HC | 0.66 | 0.75 | 0.86 | 0.75 |
| 40C: | | | | |
| Percent CO | 2.17 | 2.54 | 3.05 | 2.51 |
| Percent HC | 0.50 | 0.55 | 0.63 | 0.56 |
| 50C: | | | | |
| Percent CO | 1.73 | 1.94 | 2.10 | 1.90 |
| Percent HC | 0.72 | 0.80 | 0.84 | 0.78 |
| 50–20D: | | | | |
| Percent CO | Same as idle for D | | | |
| Percent HC | 2.80 | 3.57 | 4.71 | 3.60 |
| 30–0D: | | | | |
| Percent CO | | | | |
| Percent HC | 1.36 | 1.69 | 2.46 | 1.76 |
| 30–15D: | | | | |
| Percent CO | | | | |
| Percent HC | 1.51 | 1.92 | 2.70 | 1.99 |
| 40–20D: | | | | |
| Percent CO | | | | |
| Percent HC | 1.67 | 2.30 | 2.81 | 2.19 |
| Idle: | | | | |
| Percent CO | 4.35 | 7.21 | 9.25 | 6.69 |
| Percent HC | 0.90 | 1.10 | 1.43 | 1.11 |
| Calif. weighted values: | | | | |
| Percent CO | 3.29 | 4.22 | 5.03 | 4.18 |
| Percent HC | 0.92 | 0.95 | 1.18 | 1.02 |

TABLE II

| Cycle | 0–6.4% CO at idle | 6.5–7.9% CO at idle | 8.0–9.9% CO at idle | Average |
|---|---|---|---|---|
| 0–25A: | | | | |
| Percent CO | 3.17 | 3.88 | 4.26 | 3.6 |
| HC p.p.m | 609 | 707 | 777 | 664 |
| 30C: | | | | |
| Percent CO | 2.38 | 2.99 | 3.45 | 2.8 |
| HC p.p.m | 405 | 446 | 458 | 433 |
| 30–15D: | | | | |
| Percent CO | 3.03 | 5.54 | 6.49 | 5.0 |
| HC p.p.m | 1,224 | 1,808 | 2,318 | 1,647 |
| 15C: | | | | |
| Percent CO | 2.91 | 4.72 | 6.25 | 4.1 |
| HC p.p.m | 505 | 579 | 642 | 557 |
| 15–30A: | | | | |
| Percent CO | 2.52 | 3.00 | 3.37 | 2.8 |
| HC p.p.m | 462 | 516 | 560 | 501 |
| 50C: | | | | |
| Percent CO | 2.28 | 2.52 | 2.59 | 2.4 |
| HC p.p.m | 303 | 330 | 340 | 318 |
| 50–20D: | | | | |
| Percent CO | 3.82 | 4.68 | 5.14 | 4.2 |
| HC p.p.m | 2,803 | 3,633 | 4,629 | 3,494 |
| Idle: | | | | |
| Percent CO | 4.90 | 7.15 | 9.12 | 5.8 |
| HC p.p.m | 753 | 922 | 1,140 | 895 |
| Calif. weighted values: | | | | |
| Percent CO | 2.85 | 3.67 | 4.18 | 3.4 |
| HC p.p.m | 615 | 761 | 846 | 712 |
| $NO_x$ | 1,048 | 966 | 990 | 1,014 |

The selection of three ranges and corresponding classifications of emissions is not a critical factor in the establishment of the basic relationship discovered to obtain between the carbon monoxide content at idle and the hydrocarbon emission under running conditions. There are at present no known official standards for comparison for utilization, but other work in the field has indicated at least that not more than approximately 6½% of carbon monoxide at idle would be regarded as low emission thereof and further that above 8% would constitute high emission. In any road inspection procedure, an officially set standard must, of course, be available from the appropriate regulatory authority, and this holds true equally for use of the improvements herein disclosed for such purpose.

It will be readily appreciated that the new test procedure does not require any sophistication of equipment or on the part of the operator, the apparatus utilized is not only inexpensive but benefits significantly from the fact that commercially available carbon monoxide detecting cartridges are employed, and it is estimated that a given automobile can be tested in a little over a minute.

Other modes of applying the principle of the invention may be employed, change being made as regards the details described, provided the features stated in any of the following claims, or the equivalent of such, be employed.

I, therefore, particularly point out and distinctly claim as my invention:

1. The method of determining high pollutant emitters among gasoline engine automobiles in ordinary use, which comprises the steps of extracting a sample of the exhaust gases issuing from the engine of such an automobile while idling without atmospheric dilution of such gases, measuring the carbon monoxide content of the undiluted sample, determining from such measurement the emission level of the carbon monoxide and hydrocarbons of such exhaust gases under all conditions of operation of such engine, and rating such automobile in accordance with such determination.

2. The method of claim 1 including the step of expanding adiabatically the exhaust gases issuing from the engine, and such measuring of the carbon monoxide content is of the thus expanded gases.

3. The method of claim 1 in which the carbon monoxide content of such sample is measured by reacting the carbon monoxide in such sample with a complexing agent to give a visible color change and thus indicate the carbon monoxide content of the exhaust gases.

4. The method of determining high pollutant emitters among gasoline engine automobiles in ordinary use, which comprises the steps of extracting a sample of the exhaust gases issuing from the engine of such automobile while idling, measuring the carbon monoxide content of such extracted sample, determining from such measured carbon monoxide content of such sample the emission level of the carbon monoxide and hydrocarbons under all conditions of operation of such engine, and rating such automobile as to its pollutant emission level in accordance with such determination.

5. The method of claim 4 in which the carbon monoxide content of such sample is measured by reacting the carbon monoxide in such sample with a complexing agent to give a visible color change and thus indicate the carbon monoxide content of the exhaust gases.

References Cited

UNITED STATES PATENTS

| 2,447,595 | 8/1948 | Pigott et al. | 73—422 |
| 2,487,077 | 11/1949 | Sheperd | 23—254X |
| 3,284,165 | 11/1966 | Baumann | 73—23X |
| 3,298,786 | 1/1967 | Hinsvark | 23—254X |

RICHARD C. QUEISSER, Primary Examiner

JERRY W. MYRACLE, Assistant Examiner

U.S. Cl. X.R.

23—254; 73—421.5